United States Patent

Hooton

[11] 3,986,445
[45] Oct. 19, 1976

[54] RACK FOR BAKING FISH, POULTRY, AND THE LIKE

[76] Inventor: James D. Hooton, 4310 Mark Read St., Granger, Utah 84119

[22] Filed: Mar. 7, 1975

[21] Appl. No.: 556,255

[52] U.S. Cl. .............................. 99/426; 99/450; 211/181
[51] Int. Cl.² ........................................ A47J 43/18
[58] Field of Search ............... 99/450, 419, 426; 126/19, 273; 210/483, 499; 211/181; 248/107, 121, 153, 175, 302

[56] References Cited
UNITED STATES PATENTS

| 849,290 | 4/1907 | Vanderbilt | 99/426 |
| 3,392,665 | 7/1968 | Harnest | 99/426 |
| 3,802,330 | 4/1974 | Graziani | 99/419 |

FOREIGN PATENTS OR APPLICATIONS

| 1,121,855 | 5/1956 | France | 99/450 |

Primary Examiner—Leonard D. Christian
Assistant Examiner—Arthur O. Henderson
Attorney, Agent, or Firm—Lynn G. Foster

[57] ABSTRACT

Comprising a base, an upright support framework held erect by the base and designed to have a length essentially the length of the interior of the animal to be baked, a transverse frame for spreading and holding the interior of the animal in an opened condition and holding structure upon which seasoning, such as green peppers, onion, garlic and the like may be mounted at the interior of the animal.

3 Claims, 4 Drawing Figures

RACK FOR BAKING FISH, POULTRY, AND THE LIKE

BACKGROUND

1. Field of Invention

The present invention relates generally to racks and more particularly baking racks for cooking fish, poultry, rabbit and the like.

2. Prior Art

In the past, it has been traditional to bake fish, chicken, rabbit and the like by placing pre-cut pieces appropriately prepared with breaded material or the like, upon a tray in an oven. Often, this requires use of a spatula to turn the food periodically for uniform cooking, which often adversely results in the breaded covering being removed and/or the meat being fragmented. It is also known to bake such items over a source of heat upon a rotisserie. In either case, very often excessive temperatures or prolonged exposure to the heat source is required in order that the inside meat be cooked adequately, often causing the exterior meat to be over cooked and some times dry.

BRIEF SUMMARY AND OBJECTS OF THE PRESENT INVENTION

The present invention provides a baking rack for fish, poultry, rabbits and the like comprising a stand with surface engaging supports upon which a vertically erect frame is located. The cleaned fish, poultry, rabbit, etc. is caused to be spread or draped over the erect support and the interior caused to be held open by a spreading device of the rack. Consequently, the heated air (preferably having a high moisture content) is able to as readily reach the interior meat portions of the object being baked as it does the exterior meat portions. Seasoning is held by the rack adjacent the interior surface of the object being baked.

With the foregoing in mind, it is a primary object of the present invention to provide a novel baking rack.

It is a further significant object of the present invention to provide a novel baking rack for fish, poultry, rabbits and the like comprising an erect framework which supports the object being baked in an open condition allowing interior and exterior meat portions to cook at the same rate simultaneously.

It is a further object of the present invention to provide a novel baking rack upon which poultry, fish, rabbit or the like is spread such that seasoning is held adjacent interior meat portions of the object being baked and caused to penitrate said meat portions.

These and other objects and features of the present invention will be apparent from the following detailed description, taken with reference to the accompanying drawings.

DETAILED DESCRIPTION OF ILLUSTRATED EMBODIMENT

Figure 3:
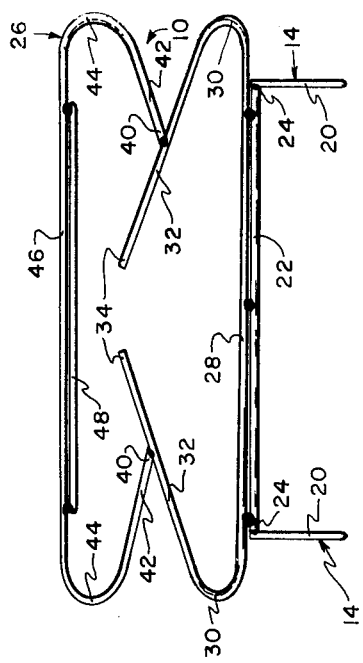
FIG. 3 is a plan view of the baking rack of FIG. 1.
Figure 4:
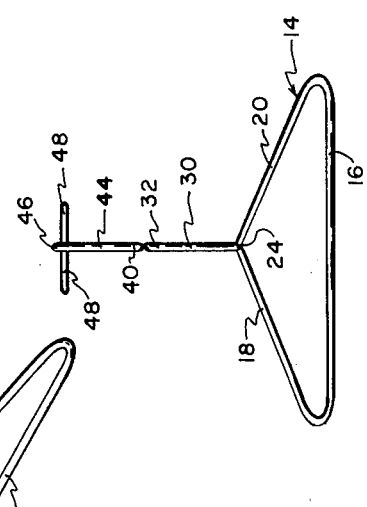
FIG. 4 is a front elevation of the baking rack of FIG. 1.
Figure 1:
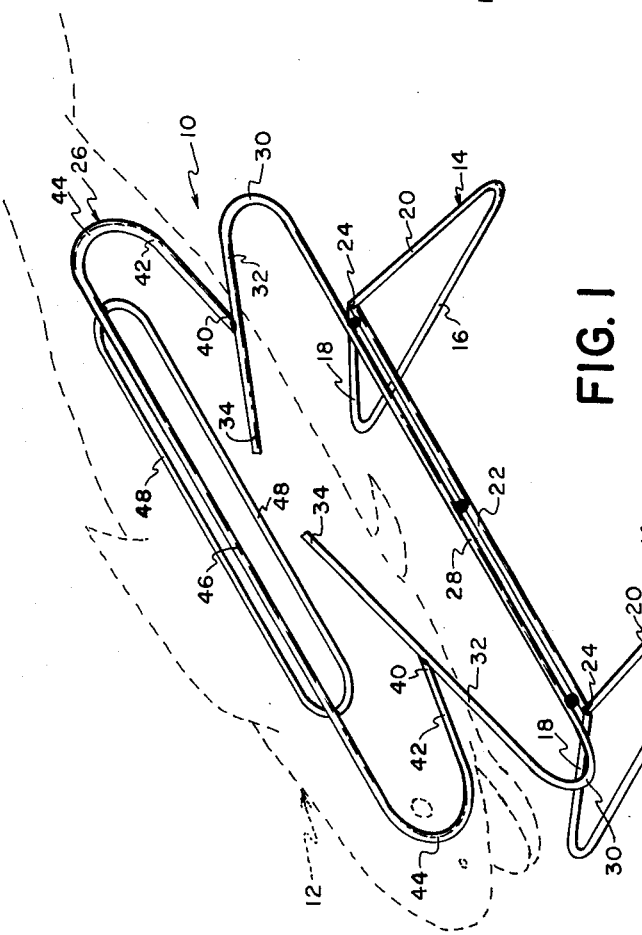
FIG. 1 is a perspective representation of a baking rack according to the present invention.
Figure 2:
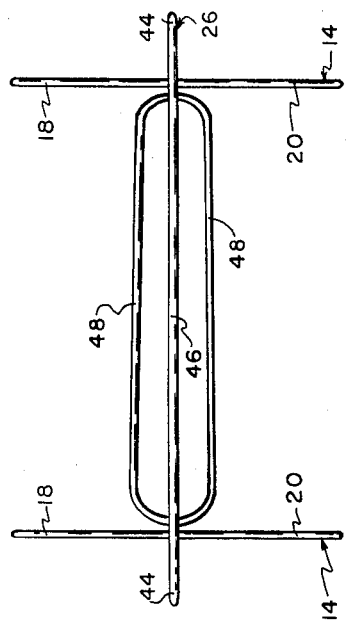
FIG. 2 is a side elevation of the baking rack of FIG. 1.

Reference is now made specifically to the drawings wherein like numerals are used to designate like parts throughout. The figures illustrate a presently preferred baking rack embodiment in accordance with the present invention, which is generally designated 10. There is illustrated in phantom lines a fish mounted (draped) upon the baking rack 10 in an open attitude ready for baking, the fish being generally designated 12. The rack 10 is illustrated as being formed of rigid, load supporting wire spot welded to a single rigid unit, although other methods of manufacture could be used. The rack 10 comprises a pair of spaced wire pedestals 14, each comprising a surface engaging base 16 and partially upwardly extending diagonal supports 18 and 20. The two pedestals 14 are connected one to another by a crosspiece 22 which spans between the apex 24 of the two diagonal supports 18 and 20 of each pedestal 14.

The cross member 22 supports a vertically erect frame work 26. More specifically, a lower crosspiece 28 of the vertically erect framework 26 is disposed immediately above and coextensive with crosspiece 22, being welded to crosspiece 22 at selected intervals. The crosspiece 28 of the erect framework 26 is illustrated as extending longitudinally beyond the two pedestals 14 at each end and there merging with a reverse curve 30 at each side. Each reverse curve merges into an upwardly and inwardly directed linear member 32, each of which defines a free end or seasoning stake 34 upon which various seasonings such as green peppers, onions, garlic, etc. may be forceably placed so as to be juxtaposed the interior surface of the object to be baked. It should be observed that the crosspiece 28, the reverse curves 30 and the linear members 32 all comprise part of a single wire to which a second single wire is mounted in vertically erect fashion. More specifically, opposed ends 40 are contiguous with and welded to the approximate mid-point of the linear members 32, each end 40 comprising part of a linear section 42 which merges into a reverse bend 44, each reverse bend 44 joining the other by an elevated crosspiece 46. It is to be noted that the ends 40, linear sections 42, reverse curves 44 and crosspiece 46 comprise a single wire disposed in the same plane as the single wire comprising crosspiece 28, reverse bends 30, and linear members 32.

A pair of opposed spreader or spacer members or loops 48 are welded at their respective ends to the crosspiece 46 and are co-extensive with the crosspiece along about two thirds the length thereof. The spreader members 48 serve to engage and force the interior of the fish, poultry, rabbit or the like into an open condition when the animal is draped over the upper portion of the rack so that the requisite high temperatures and moisture have ready access to the interior meat portions of the object being baked, the heat and moisture being caused to elevate across the seasoning such as onions, garlic, green peppers, etc. held upon the free ends 34 prior to reaching the interior meat portions of the object being baked.

Not only is the present invention extremely economical, but the need to turn or reposition the object being baked is eliminated and a more thorough method of evenly cooking the meat is the object and inherently seasoning the same is provided.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A baking rack for fish, poultry, rabbits and the like comprising:
   surface engaging support means;
   vertically extending erect means connected to said support means and over which the animal to be baked is draped;
   means mounted to an elevated portion of the erect means and extending laterally outward therefrom causing a spreading of the interior cavity of the animal whereby heat will uniformly bake the interior and exterior of meat of the animal;
   the erect means further comprising free end means having a central elevated location upon which seasoning and flavoring articles may be placed.

2. A baking rack according to claim 1 wherein said vertically extending erect means comprises a framework disposed essentially in a common vertical plane.

3. A baking rack comprising rigid wire for baking a fish, poultry, rabbits and the like having a disemboweled cavity comprising:
   a base comprising spaced surface-engaging wire support pedestals bridged by a cross-wire;
   a vertically extending erect wire frame connected to and supported by the base over which the animal to be baked is substantially horizontally draped with its disemboweled cavity facing down, said wire frame comprising a top wire;
   a wire spreader comprising opposed horizontally extending wire semi-loops connected to the top wire of the wire frame and projecting generally transverse of said top wire causing a spreading of the cavity of the animal whereby heat uniformly reaches and bakes the interior and exterior meat of the animal at an essentially uniform rate.

* * * * *